United States Patent
Laing

[15] 3,704,359
[45] Nov. 28, 1972

[54] STORAGE PANELS, PARTICULARLY FOR HEATED FLOORS

[72] Inventor: Nikolaus Laing, 7141 Aldingin-bei, Hofener Weg, Germany

[22] Filed: Oct. 28, 1970

[21] Appl. No.: 84,733

[30] Foreign Application Priority Data

Nov. 4, 1969 Austria .............. A 10333/69

[52] U.S. Cl. ............... 219/213, 165/49, 165/104, 219/345
[51] Int. Cl. .................................. H05b 1/00
[58] Field of Search....... 219/213, 378, 365, 341, 345, 219/530, 540; 126/204, 400; 165/104, 49; 237/1; 62/430, 437, 530

[56] References Cited

UNITED STATES PATENTS

| | | |
|---|---|---|
| 3,463,161 | 8/1969 | Andressy ................. 165/46 X |
| 2,702,334 | 2/1955 | Kleist ......................... 219/345 |
| 2,677,664 | 5/1954 | Telkes ................... 126/400 X |
| 2,052,014 | 8/1936 | Chamberlain ......... 165/104 X |
| 2,932,711 | 4/1960 | Adams ................... 219/213 X |
| 2,602,302 | 7/1952 | Poux ........................... 62/530 |

Primary Examiner—C. L. Albritton
Attorney—Willis H. Taylor et al.

[57] ABSTRACT

A heat storage panel consisting of a container, preferably of plastics material, and filled with a storage mass which gives off its heat of crystallization at a predetermined temperature.

21 Claims, 6 Drawing Figures

PATENTED NOV 28 1972

3,704,359

STORAGE PANELS, PARTICULARLY FOR HEATED FLOORS

THE PRIOR ART

In the past heat storage materials have been used for floor heating, which are capable of storing sensible heat only, where the material were magnesium oxide or calcium sulphate based minerals. The use of latent heat storage masses in accordance with Pat. application, 29,529/69 has the advantage that the weight required for storing any given quantity of heat is reduced to approximately one tenth that of conventional storage masses. Latent heat storage masses however have the disadvantage that they pass into the liquid phase when in their thermally charged condition and hence, by contrast with masses used in the known storage panels, are not capable of supporting a mechanical load. It is therefore necessary to introduce into the storage panels for floor heating a skeleton which can provide an adequate carrying capacity.

Where wall panels having containers are utilized and where the containers are to contain a liquid storage mass, provisions must be made in the container wall to accommodate the hydrostatic pressure in the bottom portions of the containers resulting from the geodetic height and the specific gravity of the storage mass. In the case of storage panels for ceiling heating or cooling, the wall of the storage vessel which faces the room must be sufficiently rigid to be able to support the whole of the storage mass without bulging.

All the aforesaid storage panels which are filled with a latent heat storage mass are contained in frames, which again has its disadvantages, since forces are liberated as a result of changes in volume in the course of the phase change of the storage mass, which results in relative displacement of adjacent storage panels. Moreover plaster can be joined to a wall only via the frame, and finally panels cannot be split, so that only surfaces the length and width of which are an integral multiple of panel lengths can be completely covered with the storage panels.

DESCRIPTION OF THE INVENTION

The invention relates to storage panels which do not possess these disadvantages. According to the invention the storage mass is contained in a plurality of non-communicating bulges forming individual containers in a panel consisting of two walls. Between the bulges, which are preferably circular in plan, regions are left in which load bearing constructional elements which may comprise portions of the floor, wall or ceiling, including plaster portions which enclose the storage mass, are in contact with each other. The bulges themselves are in the form of spherical segments so that the superimposed layer which, in the case of a floor constitutes the load-bearing constructional element, is of optimum shape from the static point of view since spherical recesses are able to withstand maximum compressive loads even at their thinnest places above the zenith.

The bulges may be formed on one side of the storage panel, but bulges may also be provided on both sides thereof.

Further the portion of the layers joining adjacent bulges is perforated so that, for example, where the storage panel takes the form of a portion of the floor, floor structure may be superimposed on to the panel and affixed thereto by structure extending through the perforations. In the case of wall panels for use with plaster walls, the plaster may extend through the perforations to be anchored to a building component and the panel may be affixed to the building structure by nails driven through the perforations.

The sub-division of a panel into a plurality of mutually independent storage bodies allows use of a structure which may absorb loads. The storage mass in such a panel is firmly surrounded by a wall capable of being compressively loaded, even in its liquid phase. A hydrostatic pressure acts on the storage mass uniformly in all directions within the spherical or hemispherical cavities which are formed, so that the regions which are filled with storage mass can also help to provide support. Owing to the unequal wall thickness of the layer covering the storage panel, a heat resistance results which is very small owing to the thin layer of, for example, the plaster, above the thickest point of the bulges. Thereby the heat gradient between the storage mass and the outer surface becomes very small. The sub-division into a plurality of individual bulges also makes the use of frames superfluous. The individual storage panels may be laid out in a mutually meshing relationship in such a way that no lack of uniformity whatever results in the distribution of storage mass. The heat storage panel has lines extending between the bulges in two directions at right angles to each other along which the walls between the bulges are inseparably joined. It is also possible to cut up storage panels in the residual regions between the bulges, so that no particular relationship between the length of the boundary edges of the storage panels and those of the area to be covered now need to be prescribed. Floor heating is regarded as the most important application of the invention.

Since hydrates are preferably used as the storage masses, damage to panels of the known kind, e.g., from nails, results in a gradual drying out, whereby the damaged panel becomes thermally inactive. The present invention also eliminates this disadvantage by reason of the sub-division of the storage mass into a plurality of individual hermetically sealed chambers described, since only a single storage chamber, which contains only a few percent of the storage mass of a storage panel, become inactive. Frequently different temperatures are demanded of the same heat store. This is particularly the case with floor heating, in order that heat currents of different magnitude should be produced, depending on the heating demand. This problem is solved by the invention by accommodating several storage masses of different temperature of crystallization in the storage panels, either by distributing different types of storage mass over the even or odd rows of bulges, or by sub-dividing the cavity inside a bulge into sub-chambers.

The invention will now be explained with reference to drawings:

DETAILED DESCRIPTION OF THE INVENTION

Figure 1:
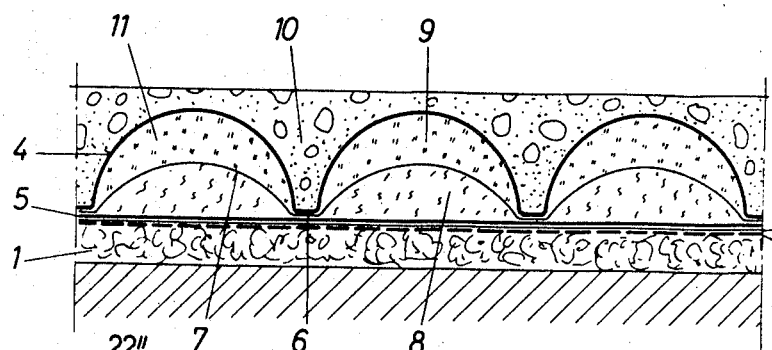
FIG. 1 is a cross section view of a floor structure having a heat storage panel according to the invention.

FIG. 1 shows a cross-section through a floor in accordance with the invention. After the thermal and sound insulation 1 follows the electric heating foil 2, thereafter a temperature-compensating aluminum sheet 3 of very small thickness, then a storage panel consisting of a first layer 4 which has semi-circular bulges formed by a vacuum process, a downwardly sealing cover plate 5 which is welded to the panel 4 at the contact points 6, and a separating foil 7 consisting of a very thin foil. Between the separating foil 7 and the plate 5 a first storage mass 8 is disposed, which is preferably designed for higher temperatures, e.g., a hydrate of a metal salt having a melting point of 37° C, whilst the storage mass body 9 enclosed between the wall of the panel 4 and the separating foil 7 consists of a hydrate which melts at a lower temperature, e.g., 32° C.

For special cases in which, for example, the floor is endangered by nails, the invention provides a wax filling and again two kinds having different melting points may be used. The melting point of the waxes is so chosen that there is a differential of several degrees between the two kinds. Upwardly the floor is bounded by a finishing layer 10 which preferably consists of a material which does not contract appreciably in the course of setting, e.g., calcium sulphate.

Figure 2:
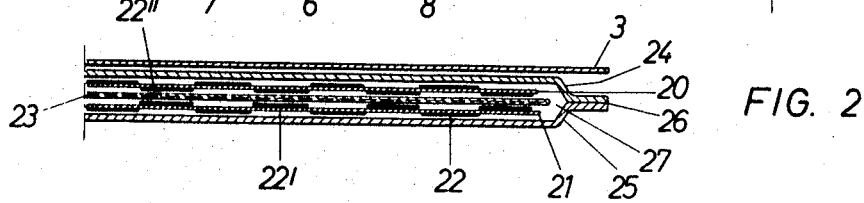
FIG. 2 is an enlarged view of a portion of FIG. 1 illustrating a heater.

FIG. 2 shows to an enlarged scale the heater 2 of FIG. 1. The heating conductor supports 20 and 21 consists of the supporting foils, e.g., of polyester material, which are rendered conductive on both sides by vapor-deposited metallic conductors 22. The two heating conductor supports are electrically separated from each other by means of a plastics foil 23. The three foils in turn are protected outwardly by two outer foils 24 and 25. The heater is provided with an air- and water-tight seal along a circumferential seam 26 by means of a thermal welding process. The foils 20, 21 and 23 are preferably treated with oil or silicon oil in order to prevent oxidation of the vapor-deposited metallic conducting layer, whilst air is evacuated from the chamber 27, before the edge 26 is finally welded up. The heating conductor support 20 is shown in FIG. 3, the heating conductor support 21 serving as a stand-by, in case the heating conductor support 20 is damaged.

Figure 3:
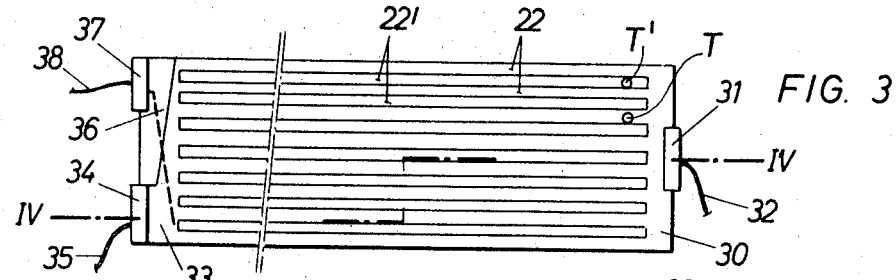
FIG. 3 diagramatically illustrates in a plan view the position of the heater strips contained in the heater of FIG. 2.
Figure 4:
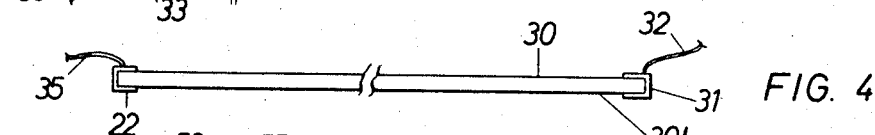
FIG. 4 is an end view of FIG. 3.

FIGS. 3 and 4 show diagrammatically the position of the heatable strips of the heater with the conductor strip 22 being disposed at the top of the heater and the strip 22' at the bottom. The two strips 22 are conductively connected together by a metallicized portion 30 on the upper part of the heater and the bottom strips 22' are conductively connected together by metallicized portion 30'' in the bottom of the heater. Metallicized portion 30 and 30' in turn are connected at one end to a supply cable 32 by means of a metallic terminal 31. The opposite ends of the top strips 22 are conductively connected by metallicized portions 33 on the upper part of the heater and are connected to a cable 35 by a metallic terminal 34. In the same manner the bottom strips 22' are united by the metallized portion 36 at the underside of the heat and conductively connected with the supply 38. A thermostat T is attached to strip 22 to open the circuit containing the strips when the strips reach a temperature slightly above the melting point of the storage mass heated by the strips. A second thermostat T' is associated with the strips 22' to open the circuit including those strips at a temperature slightly above the melting point of the storage mass heated by those strips.

Figure 5:
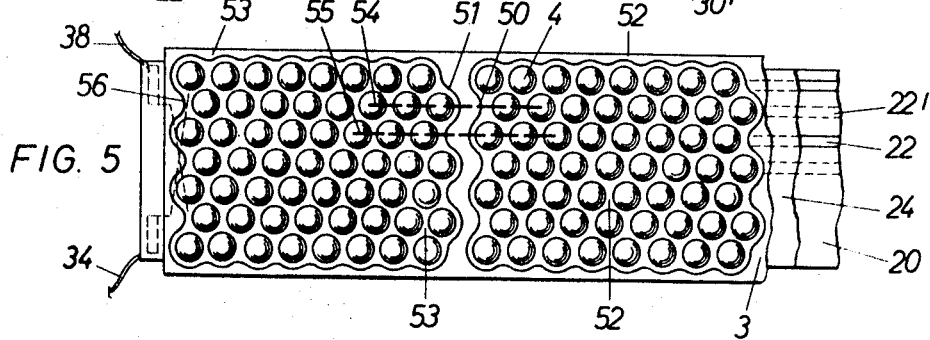
FIG. 5 is a broken plan view of a storage panel according to FIG. 1 showing the manner in which adjacent panels are joined.

FIG. 5 again shows the heater elements, viz. a heating conductor support 20 with the strips 22 and (dotted) the strips 22' which are arranged thereunder. Thereabove lies the aluminum foil 3, followed by the approximately square storage panels with the upwardly directed bulges 4. The edges are trimmed in such a way that the protrusions 51 can mesh with the recess 50, so that, after the storage panels 52 and 53 have been pushed together, continuous even rows 54 and odd rows 55 of bulges 4 are formed, which are associated with the heating strips 22' and 22. By means of this association it is possible to set the following five output steps notwithstanding the defined melting point of the masses 8 and 9, in connection with a first thermostat (not shown) which switches off at a temperature only slightly above the melting point of the storage mass 9, and a second thermostat which switches off only slightly above the melting point of the storage mass 8. Two such thermostats are associated with each side of the heating conductor support 20, so that the following output settings, rising step-by-step, are made possible:

a. low temperature row 54
b. high temperature row 54
c. low temperature rows 54 and 55
d. high temperature in both rows.

In this way it is possible to vary the storage capacity in a ratio of approximately 1 : 6.

The storage masses 8 and 9 are preferably thickened up by swellable substances, so that they do not leak out if one of the hemispheres 4 is damaged. Skeleton substances may also be added to the storage mass, so that the storage bodies proper have approximately the same degree of solidity in both the uncharged and charged condition. The aluminum foil 3 is preferably grounded, so that there shall be no danger of electrocution if the heater should be penetrated as a result of the inadvertent insertion of a nail.

Figure 6:
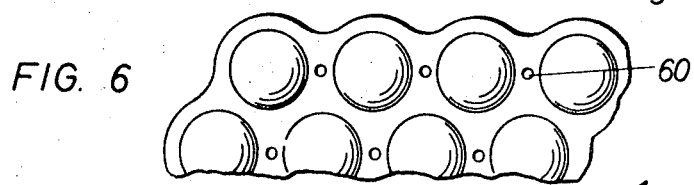
FIG. 6 is a plan view of a storage panel for use in a wall or ceiling.

FIG. 6 shows a corner section of a storage panel for building into a wall or ceiling, in which apertures 60 are provided in the regions between the bulges 6, through which nails may be hammered, for attaching such a panel to a wall or a ceiling. If the nails are only partially inserted, they form an anchorage for keying the plaster to the supporting wall when the storage panels are used on walls.

I claim:

1. A heat storage panel for use in building structural members where said panel has a multiplicity of containers therein each containing a storage mass which emits heat of crystallization at a pre-determined temperature, characterized in that each container comprises a space formed by two side walls at least one of which has a bulge shape wherein said one side wall is joined at its edges to the other side wall to form an independant sealed bulge filled with said storage mass and wherein said bulges are located on one side of said panel with adjacent bulges being uniformly spaced with respect to one another.

2. A heat storage panel according to claim 1 having lines extending between said bulges in two directions at right angles to each other wherein the side walls are joined to each other along said lines and wherein the edges of said panels extend along like lines whereby adjacent panels can be joined together in a mutually meshing manner.

3. A heat storage panel according to claim 1 wherein each bulge comprises portions of a sphere.

4. A heat storage panel according to claim 1 further characterized in that each bulge is sub-divided into at least two chambers by intermediate wall means positioned between said side walls and wherein said chambers are filled with different storage masses which emit heat of crystallization at different temperatures.

5. A heat storage panel according to claim 4 further characterized in that the storage mass having the higher melting point is arranged facing the space to be heated.

6. A heat storage mass according to claim 1 wherein the storage mass comprises a hydrate of an ionogenic salt which melts in its own water of crystallization.

7. A heat storage panel according to claim 1 wherein the bulges are hexagonally displaced whereby the centers of the bulges in one direction of the plane of the panel line lie on straight lines and in another direction on wavy lines.

8. A heat storage panel according to claim 1 having perforations in the area where said side walls are joined together.

9. A heat storage panel according to claim 1 wherein said side walls comprise a thermoplastic foil.

10. A heat storage panel according to claim 9 wherein said foil comprises in addition a vapor impermeable layer.

11. A heat storage panel according to claim 1 wherein the panels are covered with a cold setting surface finishing mass.

12. A heat storage panel according to claim 1 where the panel is bounded on one side in a plane and having in addition an electric heater including a resistance conductor strip disposed on a supporting foil which is in thermal contact with the plane whereby said heater forms a wall of the storage panel.

13. A heat storage panel according to claim 12 wherein said heater has two supporting foils one spaced above the other and encased in an insulating foil.

14. A heat storage panel according to claim 12 wherein said heater has two independent resistance conductor strips provided one above the other adapted to be energized independently.

15. A heat storage panel according to claim 12 wherein said heater has a plurality of strips and said bulges are arranged in rows with each row being superimposed relative to a strip and wherein alternate strips are connected in parallel.

16. A heat storage panel according to claim 15 wherein said strips are divided into a group of even alternate strips and a group of odd alternate strips and having in addition a first thermostat associated with said group of even alternate strips and a second thermostat associated with said group of odd alternate strips, each of said thermostats deenergizing the strips with which it is associated at a temperature slightly above the melting point of the storage mass.

17. A heat storage panel according to claim 16 having two storage masses with different melting temperatures with said group of even alternate strips heating one of said masses and said group of odd alternate strips heating the other mass and where each thermostat is set to deenergize the strip with which it is associated at a temperature slightly above the melting point of the storage mass heated by the strip.

18. A heat storage panel according to claim 15 wherein said strips are disposed alternately on opposite sides of said supporting foil.

19. A heat storage panel according to claim 18 wherein said strips are all electrically connected at one of their ends to a single supply cable and at the other ends of the strips on one side of said supporting foil being electrically connected together and at the other ends of the strips on the other side of said supporting foil being electrically connected together.

20. A heat storage panel according to claim 12 having a metal foil positioned between the heater and the storage mass.

21. A heat storage panel according to claim 20 wherein said metal foil is grounded.

* * * * *